(12) United States Patent
Rampalli et al.

(10) Patent No.: US 11,541,733 B2
(45) Date of Patent: Jan. 3, 2023

(54) OPENING STRUCTURE FOR LOWER DOOR

(71) Applicants: Hyundai Motor Company, Seoul (KR); Kia Motors Corporation, Seoul (KR)

(72) Inventors: Sudhir Rampalli, Hyderabad (IN); Ki Hyun Cho, Hwaseong-si (KR); Chung Hwa Jung, Suwon-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 218 days.

(21) Appl. No.: 17/020,252

(22) Filed: Sep. 14, 2020

(65) Prior Publication Data

US 2021/0172232 A1 Jun. 10, 2021

(30) Foreign Application Priority Data

Dec. 6, 2019 (KR) ........................ 10-2019-0161209

(51) Int. Cl.
  *B60J 5/00* (2006.01)
  *B60J 5/10* (2006.01)
  *B60R 13/04* (2006.01)

(52) U.S. Cl.
  CPC ............. *B60J 5/103* (2013.01); *B60R 13/043* (2013.01); *E05Y 2201/624* (2013.01); *E05Y 2201/702* (2013.01); *E05Y 2900/546* (2013.01)

(58) Field of Classification Search
  CPC ....... B60R 13/043; B60R 19/42; B60R 19/38; B60R 19/40; B60J 5/103; B60J 5/102
  USPC ...................................... 296/136.02
  See application file for complete search history.

(56) References Cited

U.S. PATENT DOCUMENTS 4,961,605 A * 10/1990 Cawthron ............... B60R 13/04
  293/128
9,909,347 B2 * 3/2018 Warburton ............ B60R 16/027

FOREIGN PATENT DOCUMENTS

KR 100578906 B1 5/2006

* cited by examiner

*Primary Examiner* — Daniel J Troy
*Assistant Examiner* — Daniel Alvarez
(74) *Attorney, Agent, or Firm* — Slater Matsil, LLP (57) ABSTRACT

An opening structure includes a lower door having an upper end configured to be rotated and opened with respect to a lower surface of a vehicle body, a garnish unit located on a surface of the lower door, at least a portion of a lower end of the garnish unit configured to be tilted from the lower door, a driving unit extending in a longitudinal direction and configured to apply driving force to the lower door and the garnish unit, a first driver configured to tilt the garnish unit, a second driver configured to integrally pop up the tilted garnish unit and the lower door and to apply opening force thereto, and a hinge arm connecting the first driver and the second driver to each other.

20 Claims, 5 Drawing Sheets

OPENING STRUCTURE FOR LOWER DOOR

CROSS-REFERENCE TO RELATED APPLICATIONS

This application claims priority to Korean Patent Application No. 10-2019-0161209, filed on Dec. 6, 2019, which application is hereby incorporated herein by reference.

TECHNICAL FIELD

The present disclosure relates to an opening structure for a lower door.

BACKGROUND

In general, a tailgate is an opening/closing door that is installed at the rear end of a wagon-type vehicle, a van, a recreational vehicle, or the like in order to load cargo into the rear portion of the vehicle body.

A tailgate is installed to facilitate access by a driver to a cargo compartment formed in the cabin of the vehicle. A tailgate installed at the rear end of the vehicle enables not only convenient loading and unloading of cargo into and out of a cargo compartment but also boarding and deboarding of passengers through the rear portion of the vehicle.

With the recent development of vehicles having an autonomous driving function, the standards for a driver's seat, required in order for a driver to drive a vehicle, have been relaxed, and various technologies enabling convenient boarding and deboarding in a vehicle are being researched and developed. As one of these technologies, technology for enabling boarding and deboarding through a tailgate has been developed to facilitate access to the interior of the vehicle.

However, in the case in which a tailgate is configured to open perpendicularly, a gap is formed between the external ground and the tailgate, thus causing inconvenience when boarding and deboarding. To solve this problem, a tailgate may be configured such that one end thereof comes into contact with the external ground when opened. Even in this case, however, the contact area with the external ground is small, and thus the tailgate is not capable of stably supporting a load, and furthermore is vulnerable to impact.

The above information disclosed in this Background section is only for enhancement of understanding of the background of the disclosure and therefore it may contain information that does not form the related art that is already known to a person of ordinary skill in the art.

Korean Patent Registration No. 10-0578906 discloses subject matter related to subject matter disclosed herein.

SUMMARY

Embodiments of the present disclosure solve problems associated with the related art. The present disclosure relates to an opening structure for a lower door. Particular embodiments relate to an opening structure for a lower door, which is configured such that a garnish unit is tilted by one driving unit and such that the tilted garnish unit and the lower door are integrally popped up and rotated to be opened.

Another embodiment of the present disclosure provides an opening structure for a lower door, which is configured such that, when the lower door is fully opened, a tilted garnish unit contacts the external ground.

The features of the present disclosure are not limited to the above-mentioned features, and other features not mentioned herein will be clearly understood by those skilled in the art from the following description, and will become apparent with reference to the described embodiments of the present disclosure. In addition, the features of the present disclosure can be accomplished by the components described in the appended claims and combinations thereof.

An opening structure for a lower door for achieving features of the present disclosure includes the following configurations.

In one aspect, an embodiment of the present disclosure provides an opening structure for a lower door, the opening structure including a lower door configured such that the upper end thereof is rotated and opened with respect to the lower surface of the vehicle body, a garnish unit located on one surface of the lower door, the garnish unit being configured such that at least a portion of the lower end thereof is tilted from the lower door, a driving unit extending in a longitudinal direction to apply driving force to the lower door and the garnish unit, a first driver configured to tilt the garnish unit, a second driver configured to integrally pop up the tilted garnish unit and the lower door and to apply opening force thereto, and a hinge arm configured to connect the first driver and the second driver to each other.

In a preferred embodiment, the garnish unit may include a garnish body configured to be tilted from the lower door, a garnish hinge configured to connect the upper portion of the garnish body to the lower door, and a garnish lever connected to the lower portion of the garnish body, and the garnish body may be tilted from the lower door in a manner such that the lower end thereof is rotated about the garnish hinge.

In another preferred embodiment, the garnish body may include a garnish panel configured to contact the external ground when the lower door is fully opened, a first impact member formed inside the garnish panel, an absorbing member located between the garnish panel and the first impact member to absorb energy, one or more spring members disposed so as to be spaced apart from each other in the absorbing member to provide compressive force, a second impact member formed inside the first impact member, and a damping spring located between the first impact member and the second impact member.

In still another preferred embodiment, the first driver may include a connection lever configured to connect the driving unit to the garnish unit and a hinge base having a first groove along which the driving unit moves. The first driver may form a first operation section in which one end of the driving unit moves in a longitudinal direction along the first groove, and the garnish unit may be tilted to a predetermined angle in the first operation section.

In yet another preferred embodiment, the second driver may include a latch unit configured such that the lower door is locked thereto or released therefrom, a striker base having a second groove along which the hinge arm moves, and a striker formed on the striker base. The second driver may form a second operation section in which the driving unit, having passed through the first operation section, moves integrally with the first driver along the second groove in the longitudinal direction, and the hinge arm may move in the longitudinal direction along the second groove in the second operation section such that the tilted garnish unit and the lower door pop up.

In still yet another preferred embodiment, the latch unit may include a release lever configured to rotate in contact with one end of the driving unit that has passed through the first operation section, a pawl configured to be rotated by one end of the release lever, and a claw configured to be rotated in response to rotation of the pawl. The first driver may be released from the striker by rotation of the claw and may be unlocked from the second driver.

In a further preferred embodiment, the driving unit may move in the longitudinal direction along the first groove in the first operation section to apply tension to the connection lever and to tilt the garnish unit to a predetermined angle.

In another further preferred embodiment, the driving unit may be configured to move 33 mm to 39 mm in the longitudinal direction along the first groove.

In still another further preferred embodiment, when one end of the driving unit applies external force to the release lever in the first operation section, the pawl and the claw are rotated, and the striker may be released from the claw and may be continuously extended to the second operation section by the driving unit.

In yet another further preferred embodiment, when the hinge arm moves along the second operation section, the first driver, the garnish unit, and the lower door may integrally pop up.

In still yet another further preferred embodiment, the hinge arm may move 145 mm to 155 mm in the longitudinal direction along the second groove in the second operation section.

In a still further preferred embodiment, in a third operation section after the second operation section, the first driver, the garnish unit, and the lower door may be integrally rotated and opened with respect to the hinge arm.

In a yet still further preferred embodiment, the driving unit may include an actuator configured to apply driving force and a spindle configured to be moved in the longitudinal direction by the actuator.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a that have two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of embodiments of the present disclosure throughout the several figures of the drawings.

DETAILED DESCRIPTION OF ILLUSTRATIVE EMBODIMENTS

Hereinafter, embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be more thorough and complete, and will more fully convey the scope of the disclosure to those skilled in the art.

The terms "part", "unit", and "member" used in the specification mean units for processing at least one function or operation, and may be implemented using hardware components, software components, or combinations thereof.

Further, the term "first operation section" used in the specification indicates a section in which one end of a driving unit 300 moves along a first groove 421 in a longitudinal direction, the term "second operation section" indicates a section in which the driving unit 300, having passed through the first operation section, moves integrally with a first driver 400 along a second groove 531 in the longitudinal direction, and the term "third operation section" indicates a section in which the driving unit 300, having passed through the second operation section, additionally moves in the longitudinal direction. The first operation section to the third operation section may be sequentially arranged.

Furthermore, the term "door" used in the specification includes both a front door and a rear door, and the following description in the specification will focus on one end of the door.

Figure 1:
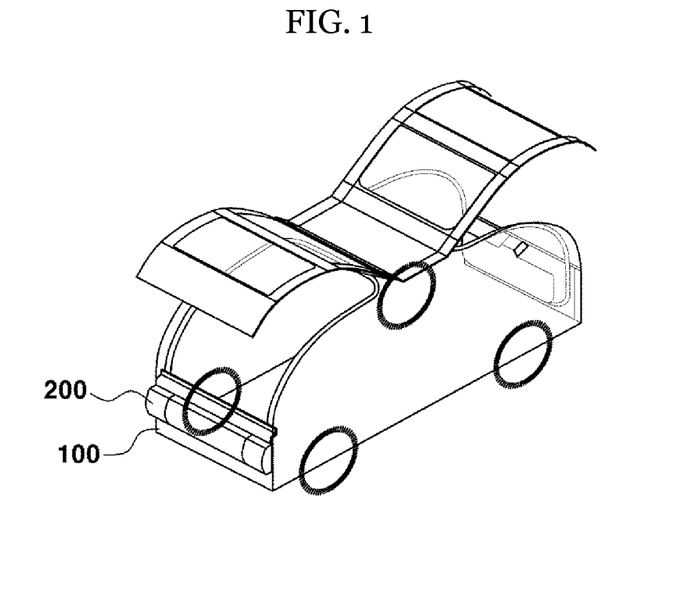
FIG. 1 is a view illustrating the closed state of an opening structure for a lower door according to an embodiment of the present disclosure.
Figure 2:
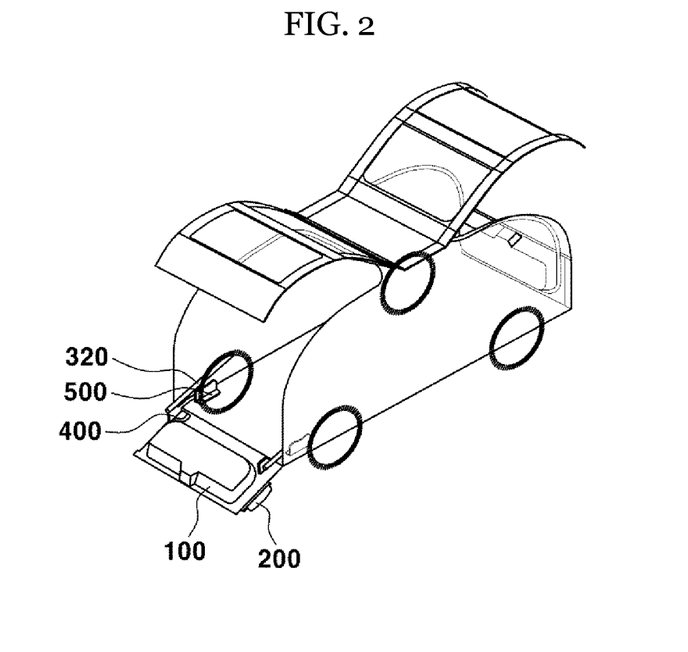
FIG. 2 is a view illustrating the fully opened state of the opening structure for a lower door according to an embodiment of the present disclosure.

FIG. 1 is a view illustrating the closed state of an opening structure for a lower door according to an embodiment of the present disclosure, and FIG. 2 is a view illustrating the fully opened state of the opening structure for a lower door according to an embodiment of the present disclosure.

The opening structure for a lower door according to an embodiment of the present disclosure includes a lower door 100 configured such that the upper end thereof is rotated and opened with respect to the lower surface of the vehicle body, a garnish unit 200 located on one surface of the lower door 100 and configured such that at least a portion of the lower end thereof is tilted from the lower door 100, a driving unit 300 extending in a longitudinal direction to apply driving force to the lower door 100 and the garnish unit 200, a first driver 400 configured to tilt the garnish unit 200, a second driver 500 configured to integrally pop up the tilted garnish unit 200 and the lower door 100 and to apply opening force thereto, and a hinge arm 520 configured to connect the first driver 400 and the second driver 500 to each other.

Referring to FIGS. 1 and 2, an upper door may be configured such that, with respect to an upper end thereof, which is adjacent to the roof of the vehicle, the bottom end thereof, which is close to the rear portion of the vehicle, is rotated and opened in a height direction. The lower door 100 may be provided adjacent to the bottom end of the upper door.

The lower door 100 may be rotated and opened with respect to the lower surface of the vehicle body. More preferably, the lower door 100, which receives opening force from the driving unit 300, may be rotated and opened with respect to the hinge arm 520.

When the lower door 100 is fully opened, an occupant may get into or out of the vehicle. More preferably, when an occupant gets into or out of the vehicle, the garnish unit 200 located on one surface of the lower door 100 may come into contact with the external ground, thereby securing convenience and support stability when getting into or out of the vehicle.

The garnish unit 200 may be located on one surface of the lower door 100, and at least a portion of the lower end thereof may be tilted from the lower door 100. More preferably, referring to FIGS. 3-6, the garnish unit 200 may include a garnish body 210 configured to be tilted from the lower door 100, a garnish hinge 220 configured to connect the upper portion of the garnish body 210 to the lower door 100, and a garnish lever 230 connected to the lower portion of the garnish body 210. The garnish body 210 may be tilted from the lower door 100 in a manner such that the lower end thereof is rotated about the garnish hinge 220.

Figure 6:
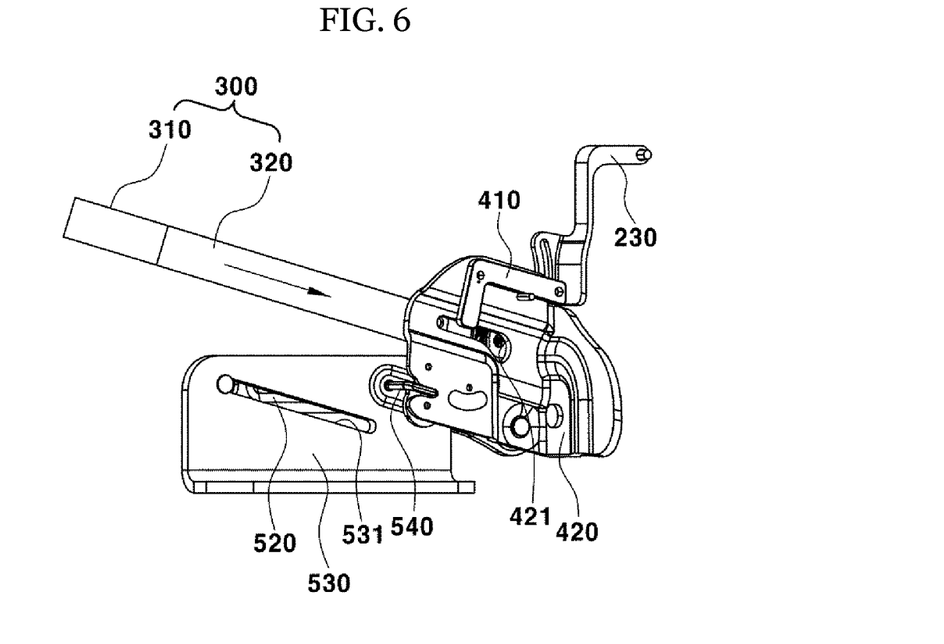
FIG. 6 is a view illustrating a driving unit of the opening structure for a lower door according to an embodiment of the present disclosure.

The driving unit 300 may extend in the longitudinal direction to apply driving force to the lower door 100 and to the garnish unit 200. More preferably, the driving unit 300 may include an actuator 310 configured to apply driving force and a spindle 320 configured to be moved in the longitudinal direction by the actuator 310.

The spindle 320 may be configured to extend in the longitudinal direction when the driving force of the actuator 310 is applied thereto. More preferably, when the driving force of the actuator 310 is applied to the spindle 320, the distal end of the spindle 320 may push the first driver 400, which is located on the rear surface of the lower tailgate, in the longitudinal direction. Subsequently, when additional driving force of the actuator 310 is applied to the spindle 320, the spindle 320 and the first driver 400 may move the hinge arm 520 integrally in the longitudinal direction.

The first driver 400 may tilt the garnish unit 200. More preferably, the spindle 320 may be extended in the longitudinal direction in response to a user's opening input, and may apply tension to the first driver 400. When tension is applied to the first driver 400, the lower end of the garnish unit 200 may be tilted from the lower door 100 to a preset angle.

The second driver 500 may be configured to apply opening force to the tilted garnish unit 200 and to the lower door 100 such that the tilted garnish unit 200 and the lower door 100 pop up integrally. The second driver 500 may be connected to the first driver 400 via the hinge arm 520. Thus, when the first driver 400 moves, tension may be applied to the hinge arm 520. More preferably, the spindle 320, which has been extended to tilt the garnish unit 200, may be additionally extended in the longitudinal direction to apply tension to the hinge arm 520. When tension is applied to the hinge arm 520, the tilted garnish unit 200 and the lower door 100 may integrally pop up, and subsequently may be rotated and opened with respect to one end of the hinge arm 520.

Figure 3:
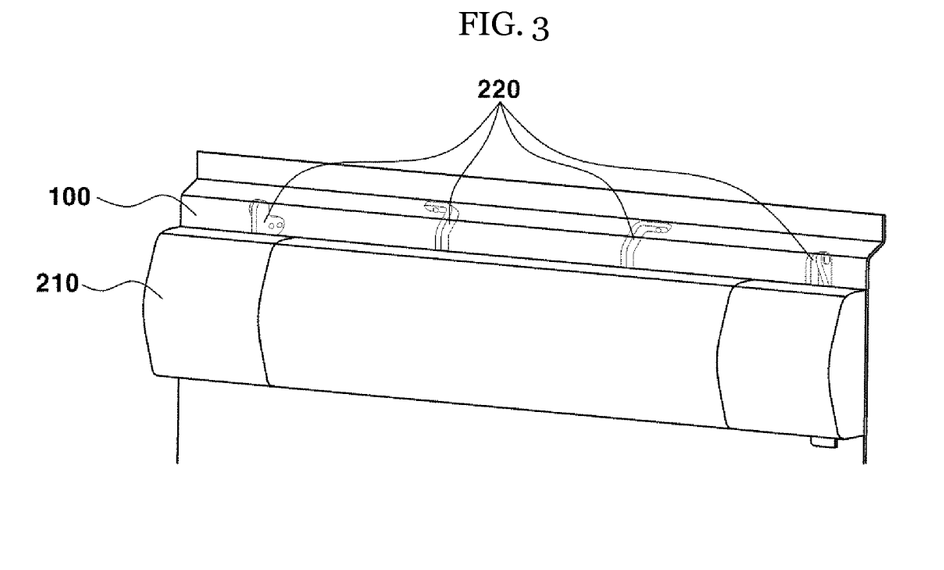
FIG. 3 is a perspective view of a garnish unit of the opening structure for a lower door according to an embodiment of the present disclosure.
Figure 4:
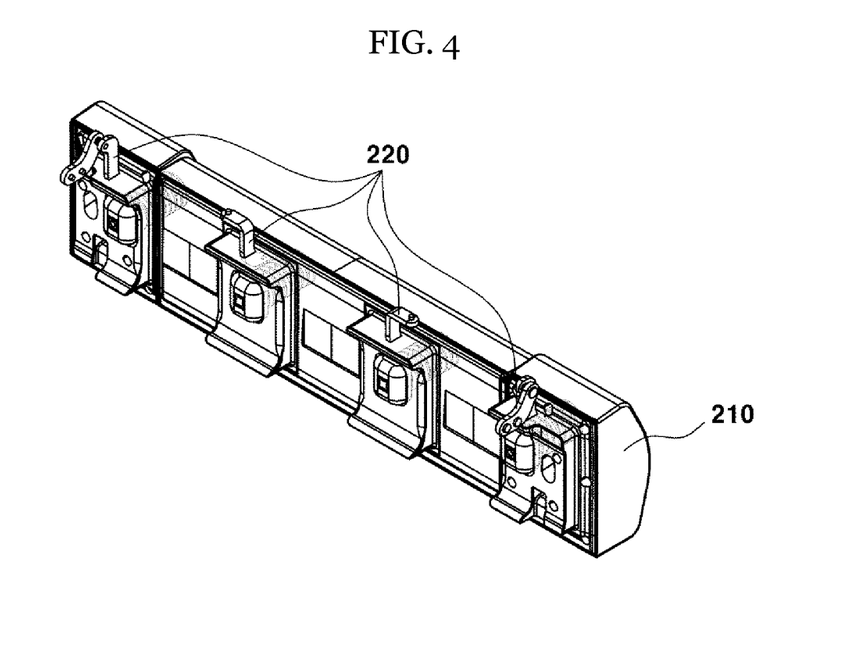
FIG. 4 is a rear view of the garnish unit of the opening structure for a lower door according to an embodiment of the present disclosure.
Figure 5:
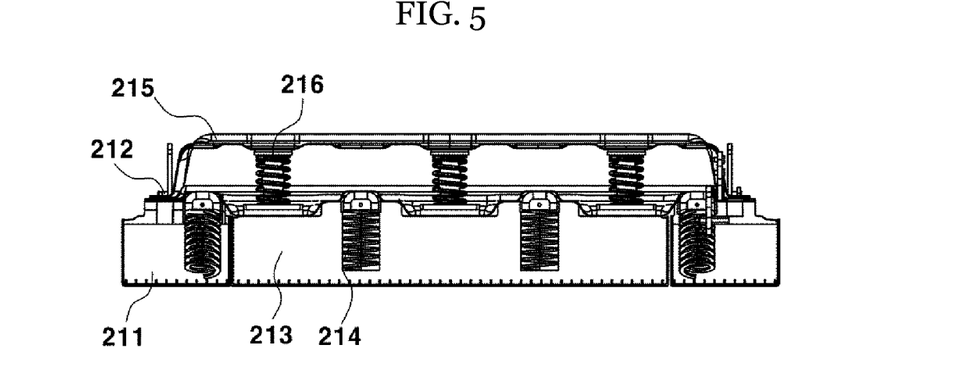
FIG. 5 is a cross-sectional view of the garnish unit of the opening structure for a lower door according to an embodiment of the present disclosure.

FIG. 3 is a perspective view of the garnish unit 200 of the opening structure for the lower door 100 according to an embodiment of the present disclosure, FIG. 4 is a rear view of the garnish unit 200 of the opening structure for the lower door 100 according to an embodiment of the present disclosure, and FIG. 5 is a cross-sectional view of the garnish unit 200 of the opening structure for the lower door 100 according to an embodiment of the present disclosure.

Referring to FIGS. 3 to 5, the garnish body 210 according to an embodiment of the present disclosure may include a garnish panel 211 configured to contact the external ground when the lower door 100 is fully opened, a first impact member 212 formed inside the garnish panel 211, an absorbing member 213 located between the garnish panel 211 and the first impact member 212 to absorb energy, one or more spring members 214 disposed so as to be spaced apart from each other in the absorbing member 213 to provide compressive force, a second impact member 215 formed inside the first impact member 212, and a damping spring 216 located between the first impact member 212 and the second impact member 215.

The garnish hinge 220 may be formed on the upper portion of the garnish body 210 to connect the garnish body 210 to the lower door 100. One or more garnish hinges 220 may be formed on the upper portion of the garnish body 210 so as to be spaced apart from each other. The lower end of the garnish body 210 may be rotated about the garnish hinge 220, and may be tilted from the lower door 100.

The garnish lever 230, which is connected to the first driver 400, may be formed on the lower portion of the garnish body 210. The garnish lever 230 may be formed at a position corresponding to the first driver 400. When the first driver 400 applies tension thereto, the garnish lever 230 may tilt the garnish body 210 to a predetermined angle. One end of the garnish lever 230 may be connected to a connection lever 410, and the opposite end thereof may be connected to the rear surface of the garnish unit 200.

The angle to which the garnish body 210 is tilted with respect to the lower door 100 may be 4° to 8°, and may preferably be 6°. Thus, when the lower door 100 is fully opened, it is possible to enable the garnish body 210 to contact the external ground without a gap therebetween by adjusting the tilting angle of the garnish body 210, thereby increasing support stability.

The garnish panel 211 may include a center portion and side portions formed at the two opposite ends thereof. When the garnish unit 200 is tilted, only the side portions of the garnish panel 211 may be tilted, or only the center portion of the garnish panel 211 may be tilted. In another embodiment, the center portion and the side portions of the garnish panel 211 may be tilted together.

When the lower door 100 is fully opened, the garnish panel 211 may contact the external ground. The garnish panel 211 may have a curved shape in order to secure support stability when contacting the external ground. In addition, the garnish panel 211 may be formed of a reinforced plastic material in order to prevent damage attributable to repeated contact with the external ground. However, the present disclosure is not limited thereto.

The spring member 214, the first impact member 212, the damping spring 216, and the second impact member 215 may be sequentially stacked inside the garnish panel 211. In addition, the absorbing member 213 is formed between the garnish panel 211 and the first impact member 212 to absorb energy, thereby alleviating impacts in the event of a collision of the rear portion of the vehicle or when the garnish panel 211 contacts the external ground due to opening of the lower door 100 and increasing support stability when an occupant gets into or out of the vehicle.

Figure 7:
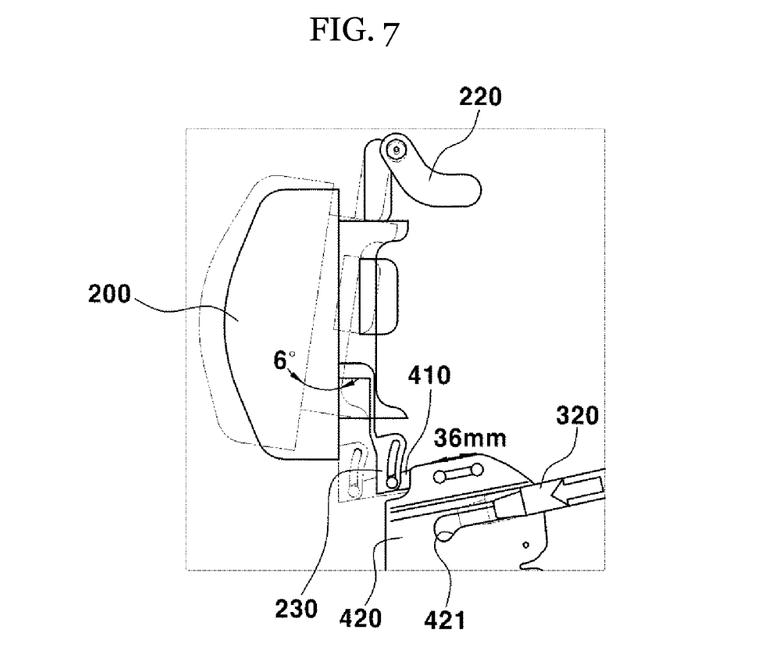
FIG. 7 is a view illustrating the state in which the opening structure for a lower door according to an embodiment of the present disclosure operates in a first operation section.

FIG. 6 is a view illustrating the driving unit 300 of the opening structure for the lower door 100 according to an embodiment of the present disclosure, and FIG. 7 is a view illustrating the state in which the opening structure for the lower door 100 according to an embodiment of the present disclosure operates in the first operation section.

Referring to FIG. 6, the first driver 400 may include a connection lever 410 connecting the driving unit 300 to the garnish unit 200 and a hinge base 420 having a first groove 421 along which the driving unit 300 moves. The first driver 400 may form the first operation section in which one end of the driving unit 300 moves in the longitudinal direction along the first groove 421. The garnish unit 200 may be tilted to a predetermined angle in the first operation section.

The second driver 500 may include a latch unit 510 configured such that the lower door 100 is locked thereto or released therefrom, a striker base 530 having a second groove 531 along which the hinge arm 520 moves, and a striker 540 formed on the striker base 530. The second driver 500 may form the second operation section in which the driving unit 300, having passed through the first operation section, moves integrally with the first driver 400 along the second groove 531 in the longitudinal direction. The hinge arm 520 may move in the longitudinal direction along the second groove 531 in the second operation section such that the tilted garnish unit 200 and the lower door 100 pop up.

The first driver 400 may be locked to the second driver 500 via the striker 540, and may be formed at a position corresponding to the driving unit 300 in the width direction of the vehicle. The second driver 500 may be formed at a position corresponding to the first driver 400. When the driving unit 300 applies driving force, the spindle 320 may first move along the first driver 400, and the first driver 400 may be released from the second driver 500 via the striker 540. Thereafter, when the driving unit 300 continuously applies driving force, the first driver 400 and the spindle 320 may move together along the fixed second driver 500. When the first driver 400 and the spindle 320 move, tension may be applied to the hinge arm 520 such that the hinge arm 520 moves in the longitudinal direction.

The connection lever 410 may be located at one end of the hinge base 420 so as to connect the driving unit 300 to the garnish unit 200. More preferably, one end of the connection lever 410 may be connected to one end of the garnish lever 230, and the opposite end of the connection lever 410 may be connected to one end of the spindle 320 of the driving unit 300, thereby applying tension to the garnish unit 200.

The hinge base 420 may be fixed to each of the two opposite ends of the rear surface of the lower door 100. More preferably, the hinge base 420 may be fixed to the rear surface of the lower door 100 with a predetermined contact area such that the lower door 100 receives tension by which the lower door 100 is capable of popping up and rotating to be opened. Further, when the lower door 100 pops up and rotates to be opened, the hinge base 420 may also move integrally therewith.

The first groove 421 may be formed in one surface of the hinge base 420 in the longitudinal direction. More preferably, the length of the first groove 421 may be set so as to correspond to the angle to which the garnish unit 200 is tilted. One end of the spindle 320 may move in the longitudinal direction along the first groove 421 to apply tension to the connection lever 410, and may tilt the garnish unit 200 to a predetermined angle through the garnish lever 230.

The spindle 320 may be provided at one end thereof with a ball joint to prevent the spindle 320 from moving when the hinge base 420 rotates. More preferably, one end of the spindle 320 may move from one end of the first groove 421 to the opposite end of the first groove 421 in the outward direction of the vehicle. Due to the additional extension of the spindle 320, the opposite end of the hinge arm 520 may move from one end of the second groove 531 to the opposite end of the second groove 531 in the outward direction of the vehicle. When the hinge base 420 and the lower door 100 integrally rotate due to the additional extension of the spindle 320, the spindle 320 may remain stationary. Further, when tension is applied to the connection lever 410 through the ball joint, the spindle 320 may have one degree of freedom.

In the first operation section, one end of the driving unit 300 may move in the longitudinal direction along the first groove 421. More preferably, the first operation section may be configured such that one end of the spindle 320 moves in the longitudinal direction along the first groove 421 to tilt the garnish unit 200.

Figure 8:
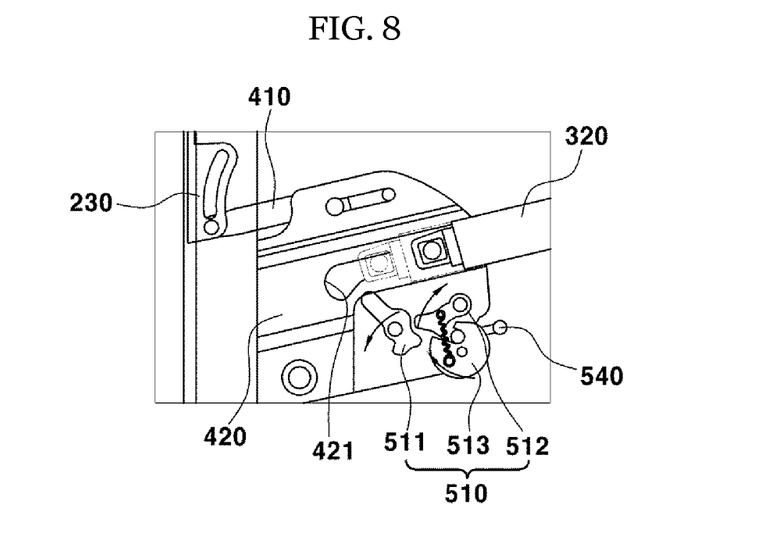
FIG. 8 is a view illustrating a latch unit of the opening structure for a lower door according to an embodiment of the present disclosure.

The latch unit 510 may be located on one surface of the hinge base 420 such that the lower door 100 is unlocked. More preferably, the latch unit 510 may unlock the first driver 400, which is in the state of being locked to the second driver 500, such that the garnish unit 200 is tilted, and subsequently, the tilted garnish unit 200 and the lower door 100 integrally pop up.

One end of the hinge arm 520 may be connected to the hinge base 420, and the opposite end thereof may be connected to the striker base 530. The lower door 100 may pop up due to the driving force applied to the hinge arm 520 by the driving unit 300. In this case, one end of the hinge arm 520 may be formed in a bent shape so that the lower door 100 may pop up in the downward direction of the vehicle body. In addition, the lower door 100 may be rotated and opened with respect to one end of the hinge arm 520.

The striker base 530 may be fixed to the lower surface of the vehicle body, and may be formed at a position corresponding to the hinge base 420. When the lower door 100 is in a closed state or in the first operation section, the striker base 530 may be in the state of being connected to the hinge base 420 via the striker 540. When unlocked via the latch unit 510, the hinge arm 520 may move in the longitudinal direction such that the hinge base 420 moves away from the striker base 530.

The second groove 531 may be formed in one surface of the striker base 530 in the longitudinal direction. More preferably, the length of the second groove 531 may be set so as to correspond to the length to which the lower door 100 pops up. The opposite end of the hinge arm 520 may be moved from one end of the second groove 531 to the opposite end of the second groove 531 in the outward direction of the vehicle by extension of the spindle 320. In this case, the hinge arm 520 may move to pop up the lower door 100 to a predetermined length via the hinge base 420.

The hinge arm 520 may be provided at one end thereof and at the opposite end thereof with ball joints to prevent the hinge arm 520 from moving when the hinge base 420 rotates after the hinge arm 520 moves to the opposite end of the second groove 531.

The striker 540 may be fixedly formed at a position corresponding to the latch unit 510 on one surface of the striker base 530. Due to the latching shape of the striker 540, the first driver 400 may cause the lower door 100 to be maintained in a closed state and in the state of being locked to the second driver 500 in the first operation section.

Figure 9:
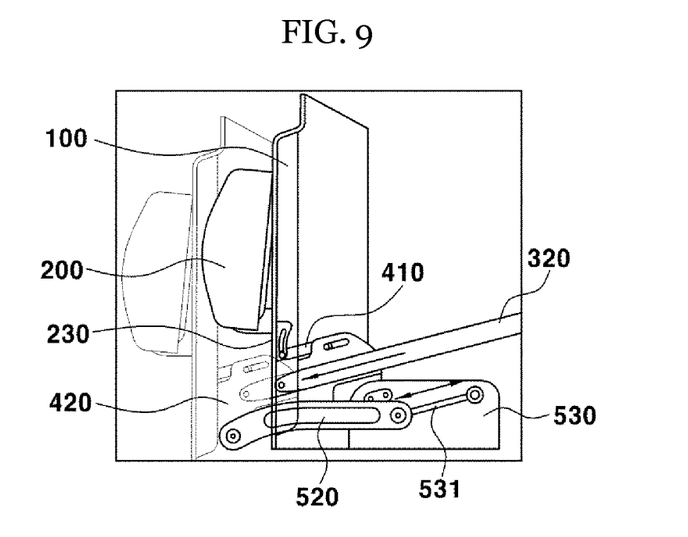
FIG. 9 is a view illustrating the state in which the opening structure for a lower door according to an embodiment of the present disclosure operates in a second operation section.

In the second operation section, the driving unit 300, having passed through the first operation section, may move in the longitudinal direction along the second groove 531 integrally with the first driver 400. More preferably, the second operation section may be configured such that the opposite end of the hinge arm 520 moves in the longitudinal direction along the second groove 531 to pop up the lower door 100.

Referring to FIG. 7, the opening structure for the lower door 100 according to an embodiment of the present disclosure may be configured such that the driving unit 300 moves in the longitudinal direction along the first groove 421 in the first operation section to apply tension to the connection lever 410 and to tilt the garnish unit 200 to a predetermined angle. More preferably, the driving unit 300 may be configured to move 33 mm to 39 mm in the longitudinal direction along the first groove 421.

When one end of the spindle 320 moves 33 mm to 39 mm, e.g., 36 mm, along the first groove 421, the opposite end of the connection lever 410 may move corresponding thereto, and one end of the connection lever 410 may apply tension to one end of the garnish lever 230 such that the opposite end of the garnish lever 230 tilts the garnish unit 200. In this case, the tilting angle of the garnish unit 200 may be 4° to 8° with respect to the lower door 100, and may preferably be 6°.

FIG. 8 is a view illustrating the latch unit 510 of the opening structure for the lower door 100 according to an embodiment of the present disclosure.

Referring to FIG. 8, in the opening structure for the lower door 100 according to an embodiment of the present disclosure, the latch unit 510 may include a release lever 511 configured to rotate in contact with one end of the driving unit 300, which has passed through the first operation section, a pawl 512 configured to be rotated by one end of the release lever 511, and a claw 513 configured to be rotated in response to the rotation of the pawl 512. The first driver 400 may be released from the striker 540 by the rotation of the claw 513, and may be unlocked from the second driver 500.

Further, when one end of the driving unit 300 applies external force to the release lever 511 in the first operation section, the pawl 512 and the claw 513 may be rotated, and the striker 540 may be released from the claw 513 and may be continuously extended to the second operation section by the driving unit 300.

The release lever 511 may be formed on one surface of the hinge base 420 so as to be rotatable about a reference axis. More preferably, when one end of the spindle 320 is located at the end of the first groove 421 that is close to the outer side of the vehicle, the one end of the spindle 320 may rotate one end of the release lever 511.

The pawl 512 and the claw 513 may be located adjacent to the release lever 511 on one surface of the hinge base 420, and may be moved in conjunction with rotation of the opposite end of the release lever 511. The movement of the pawl 512 and the claw 513 may cause the striker 540 to be released from the claw 513.

When one end of the spindle 320 is located at the end of the first groove 421 that is close to the outer side of the vehicle and thus the striker 540 is released from the claw 513, the striker 540 may be continuously extended to the second operation section by the additional movement of the spindle 320. More preferably, the first driver 400 and the second driver 500 may be connected to each other via the hinge arm 520, and one end of the spindle 320 may be moved by the driving unit 300. Thereafter, when additional driving force is applied, the hinge arm 520 may move to pop up the lower door 100.

FIG. 9 is a view illustrating the state in which the opening structure for the lower door 100 according to an embodiment of the present disclosure operates in the second operation section.

Referring to FIG. 9, the opening structure for the lower door 100 according to an embodiment of the present disclosure may be configured such that the hinge arm 520 moves 145 mm to 155 mm in the longitudinal direction along the second groove 531 in the second operation section. Furthermore, when the hinge arm 520 moves along the second operation section, the first driver 400, the garnish unit 200, and the lower door 100 may integrally pop up.

The lower door 100 may pop up from the vehicle body to an extent corresponding to the distance that the opposite end of the hinge arm 520 moves along the second groove 531. After one end of the spindle 320 moves 33 mm to 39 mm along the first groove 421, the opposite end of the hinge arm 520 moves 145 mm to 155 mm along the second groove 531 due to the additional extension of the spindle 320, and accordingly, the lower door boo may pop up.

The lower door 100 may pop up integrally with the tilted garnish unit 200. More preferably, after the first driver 400 tilts the garnish unit 200, the first driver 400 may be unlocked from the second driver 500 and the first driver 400 and the hinge arm 520 may move in the longitudinal direction due to the additional extension of the spindle 320, thereby popping up the lower door 100.

Figure 10:
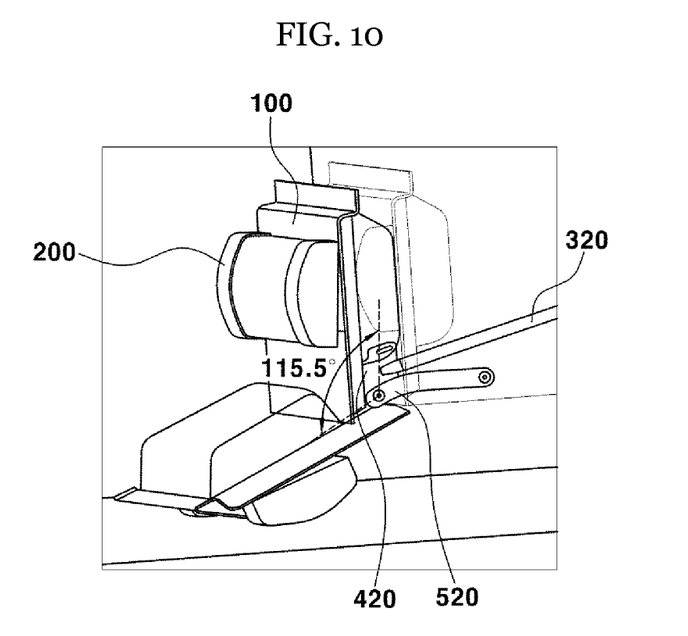
FIG. 10 is a view illustrating the state in which the opening structure for a lower door according to an embodiment of the present disclosure operates in a third operation section.

FIG. 10 is a view illustrating the state in which the opening structure for the lower door 100 according to an embodiment of the present disclosure operates in the third operation section.

Referring to FIG. 10, the opening structure for the lower door 100 according to an embodiment of the present disclosure may be configured such that, after the second operation section, the first driver 400, the garnish unit 200, and the lower door 100 are integrally rotated and opened with respect to the hinge arm 520 in the third operation section.

When one end of the spindle 320 moves and is located at the end of the first groove 421 that is close to the outer side of the vehicle in the first operation section, the first driver 400 may be unlocked from the second driver 500. In the second operation section, the first driver 400 may move in the longitudinal direction together with the spindle 320, and thus the hinge arm 520, which is connected to the hinge base 420, may move. The hinge base 420 of the first driver 400 may be fixedly mounted on the rear surface of the lower door 100, and may move together with the lower door 100 when the lower door 100 pops up.

After the second operation section, the lower door 100 may be rotated and opened integrally with the tilted garnish unit 200 and the first driver 400 in the third operation section. More preferably, in the third operation section, the first driver 400 and the lower door 100 including the garnish unit 200 may be integrally rotated and opened with respect to one end of the hinge arm 520.

In one embodiment, in the second operation section, the spindle 320 may be extended such that the opposite end of the hinge arm 520 moves 150 mm along the second groove 531, and may be additionally extended by 134 mm, thereby rotating and opening the lower door 100.

In summary, the opening structure for the lower door 100 according to embodiments of the present disclosure is configured such that the garnish unit 200 is tilted by the driving unit 300 and such that the tilted garnish unit 200 and the lower door 100 are connected so as to integrally pop up and rotate to be opened.

As is apparent from the above description, the opening structure for a lower door according to embodiments of the present disclosure has the following effects.

A garnish unit may be tilted by one driving unit, and the tilted garnish unit and the lower door may integrally pop up and rotate to be opened without a separate actuator.

In addition, when the lower door is fully opened, the tilted garnish unit may contact the external ground, thereby improving the convenience of an occupant and increasing support stability.

The foregoing detailed description of the present disclosure is merely illustrative. The foregoing content is intended to illustrate and describe exemplary embodiments of the present disclosure, and the present disclosure may be used in various other combinations, modifications, and environments. That is, the present disclosure may be modified or changed within the scope of the concept of the present disclosure disclosed herein, the scope equivalent to the foregoing content, and/or the scope of technology or knowledge known in the art. The embodiments described above are intended to describe the best mode for implementing the technical idea of the present disclosure, and various modifications required for specific applications and uses of the present disclosure are also possible. Thus, the foregoing detailed description is not intended to limit the present disclosure to the disclosed modes. The appended claims should be interpreted as also including other modes.

What is claimed is:

1. An opening structure comprising:
   a lower door having an upper end configured to be rotated and opened with respect to a lower surface of a vehicle body;
   a garnish unit located on a surface of the lower door, at least a portion of a lower end of the garnish unit configured to be tilted from the lower door;
   a driving unit extending in a longitudinal direction of the vehicle body and configured to apply driving force to the lower door and the garnish unit;
   a first driver configured to tilt the garnish unit, wherein the first driver comprises a connection lever connecting the driving unit to the garnish unit and a hinge base having a first groove along which the driving unit is configured to move;
   a second driver configured to integrally pivot down the tilted garnish unit and the lower door and to apply opening force thereto; and
   a hinge arm connecting the first driver and the second driver to each other.

2. The opening structure of claim 1, wherein the garnish unit comprises:
   a garnish body configured to be tilted from the lower door;
   a garnish hinge connecting an upper portion of the garnish body to the lower door; and
   a garnish lever connected to a lower portion of the garnish body,
   wherein the garnish body is configured to be tilted from the lower door in a manner such that a lower end of the garnish body is rotated about the garnish hinge.

3. The opening structure of claim 2, wherein the garnish body comprises:
   a garnish panel configured to contact an external ground when the lower door is fully opened;
   a first impact member formed inside the garnish panel;
   an absorbing member located between the garnish panel and the first impact member and configured to absorb energy;
   one or more spring members disposed so as to be spaced apart from each other in the absorbing member and configured to provide compressive force;
   a second impact member formed inside the first impact member; and
   a damping spring located between the first impact member and the second impact member.

4. The opening structure of claim 1, wherein the first driver forms a first operation section in which one end of the driving unit is configured to move in the longitudinal direction along the first groove, and the garnish unit is configured to be tilted to a predetermined angle in the first operation section.

5. The opening structure of claim 4, wherein the driving unit is configured to move in the longitudinal direction along the first groove in the first operation section to apply tension to the connection lever and to tilt the garnish unit to the predetermined angle.

6. The opening structure of claim 5, wherein the driving unit is configured to move 33 mm to 39 mm in the longitudinal direction along the first groove.

7. An opening structure comprising:
   a lower door having an upper end configured to be rotated and opened with respect to a lower surface of a vehicle body;
   a garnish unit located on a surface of the lower door, at least a portion of a lower end of the garnish unit configured to be tilted from the lower door;
   a driving unit extending in a longitudinal direction of the vehicle body and configured to apply driving force to the lower door and the garnish unit;
   a first driver configured to tilt the garnish unit;
   a second driver configured to integrally pivot down the tilted garnish unit and the lower door and to apply opening force thereto; and
   a hinge arm connecting the first driver and the second driver to each other
   wherein the second driver comprises:
     a latch unit configured such that the lower door is locked thereto or released therefrom;
     a striker base having a second groove along which the hinge arm is configured to move; and
     a striker formed on the striker base,
   wherein the second driver forms a second operation section in which the driving unit, having passed through a first operation section, is configured to move integrally with the first driver along the second groove in the longitudinal direction, and wherein the hinge arm is configured to move in the longitudinal direction along the second groove in the second operation section such that the tilted garnish unit and the lower door pivot down.

8. The opening structure of claim 7, wherein the latch unit comprises:
- a release lever configured to rotate in contact with one end of the driving unit that has passed through the first operation section;
- a pawl configured to be rotated by one end of the release lever; and
- a claw configured to be rotated in response to rotation of the pawl,
- wherein the first driver is configured to be released from the striker by rotation of the claw and unlocked from the second driver.

9. The opening structure of claim 8, wherein, when one end of the driving unit applies external force to the release lever in the first operation section:
- the pawl and the claw are configured to be rotated; and
- the striker is configured to be released from the claw and be continuously extended to the second operation section by the driving unit.

10. The opening structure of claim 9, wherein, when the hinge arm moves along the second operation section, the first driver, the garnish unit, and the lower door are configured to integrally pivot down.

11. The opening structure of claim 7, wherein the hinge arm is configured to move 145 mm to 155 mm in the longitudinal direction along the second groove in the second operation section.

12. The opening structure of claim 7, wherein in a third operation section after the second operation section, the first driver, the garnish unit, and the lower door are configured to be integrally rotated and opened with respect to the hinge arm.

13. The opening structure of claim 1, wherein the driving unit comprises:
- an actuator configured to apply driving force; and
- a spindle configured to be moved in the longitudinal direction by the actuator.

14. A vehicle comprising:
- a vehicle body;
- an upper door connected to the vehicle body;
- a lower door disposed below the upper door and connected to the vehicle body, the lower door having an upper end configured to be rotated and opened with respect to a lower surface of the vehicle body;
- a garnish unit located on a surface of the lower door, at least a portion of a lower end of the garnish unit configured to be tilted from the lower door;
- a driving unit extending in a longitudinal direction of the vehicle body and configured to apply driving force to the lower door and the garnish unit;
- a first driver configured to tilt the garnish unit, wherein the first driver comprises a connection lever connecting the driving unit to the garnish unit and a hinge base having a first groove along which the driving unit is configured to move;
- a second driver configured to integrally pivot down the tilted garnish unit and the lower door and to apply opening force thereto; and
- a hinge arm connecting the first driver and the second driver to each other.

15. The vehicle of claim 14, wherein the garnish unit comprises:
- a garnish body configured to be tilted from the lower door;
- a garnish hinge connecting an upper portion of the garnish body to the lower door; and
- a garnish lever connected to a lower portion of the garnish body,
- wherein the garnish body is configured to be tilted from the lower door in a manner such that a lower end of the garnish body is rotated about the garnish hinge.

16. The vehicle of claim 15, wherein the garnish body comprises:
- a garnish panel configured to contact an external ground when the lower door is fully opened;
- a first impact member formed inside the garnish panel;
- an absorbing member located between the garnish panel and the first impact member and configured to absorb energy;
- one or more spring members disposed so as to be spaced apart from each other in the absorbing member and configured to provide compressive force;
- a second impact member formed inside the first impact member; and
- a damping spring located between the first impact member and the second impact member.

17. The vehicle of claim 14, wherein the first driver forms a first operation section in which one end of the driving unit is configured to move in the longitudinal direction along the first groove to apply tension to the connection lever and to tilt the garnish unit to a predetermined angle, and the garnish unit is configured to be tilted to the predetermined angle in the first operation section.

18. The vehicle of claim 17, wherein the second driver comprises:
- a latch unit configured such that the lower door is locked thereto or released therefrom;
- a striker base having a second groove along which the hinge arm is configured to move; and
- a striker formed on the striker base,
- wherein the second driver forms a second operation section in which the driving unit, having passed through the first operation section, is configured to move integrally with the first driver along the second groove in the longitudinal direction, and
- wherein the hinge arm is configured to move in the longitudinal direction along the second groove in the second operation section such that the tilted garnish unit and the lower door pop up pivot down.

19. The vehicle of claim 18, wherein the latch unit comprises:
- a release lever configured to rotate in contact with one end of the driving unit that has passed through the first operation section;
- a pawl configured to be rotated by one end of the release lever; and
- a claw configured to be rotated in response to rotation of the pawl,
- wherein the first driver is configured to be released from the striker by rotation of the claw and unlocked from the second driver,
- wherein, when one end of the driving unit applies external force to the release lever in the first operation section, the pawl and the claw are configured to be rotated, and the striker is configured to be released from the claw and be continuously extended to the second operation section by the driving unit, and wherein, when the hinge arm moves along the second operation section, the first driver, the garnish unit, and the lower door are configured to integrally pivot down.

20. The vehicle of claim 19, wherein, in a third operation section after the second operation section, the first driver, the garnish unit, and the lower door are configured to be integrally rotated and opened with respect to the hinge arm.

* * * * *